United States Patent
Yasunori et al.

(10) Patent No.: US 7,082,786 B2
(45) Date of Patent: *Aug. 1, 2006

(54) SCROLL COMPRESSOR AND REFRIGERATING SYSTEM USING AMMONIA GROUP REFRIGERANT

(75) Inventors: Shunsuke Yasunori, Shimizu (JP); Kenji Tojo, Moriya (JP); Mutsunori Matsunaga, Shimizu (JP)

(73) Assignee: Hitachi, Ltd.,, Tokyo (JP); trustee for the benefit of Hitachi Air Conditioning Systems Co., Ltd.

( * ) Notice: Subject to any disclaimer, the term of this patent is extended or adjusted under 35 U.S.C. 154(b) by 350 days.

This patent is subject to a terminal disclaimer.

(21) Appl. No.: 10/669,569

(22) Filed: Sep. 25, 2003

(65) Prior Publication Data

US 2004/0055328 A1 Mar. 25, 2004

Related U.S. Application Data

(63) Continuation of application No. 10/237,728, filed on Sep. 10, 2002, now Pat. No. 6,708,520.

(30) Foreign Application Priority Data

Sep. 10, 2001 (JP) ........................... 2001-272855

(51) Int. Cl.
*F25B 31/00* (2006.01)
*F25B 1/00* (2006.01)

(52) U.S. Cl. ............................. 62/505; 62/84; 62/114

(58) Field of Classification Search ............... 62/505
See application file for complete search history.

(56) References Cited

U.S. PATENT DOCUMENTS

| 4,160,178 A | 7/1979 | Smith |
| 5,015,159 A | 5/1991 | Mine |
| 5,303,565 A | 4/1994 | Pravda |
| 5,382,859 A | 1/1995 | Huang |
| 5,573,088 A | 11/1996 | Daniels |

(Continued)

FOREIGN PATENT DOCUMENTS

| CN | 1309279 | 8/2001 |
| EP | 0729214 | 8/1996 |
| JP | 2294580 | 12/1990 |
| JP | 10112949 | 10/1998 |
| JP | 200083339 | 3/2000 |
| JP | 2001227778 | 8/2001 |

*Primary Examiner*—Denise L. Esquivel
*Assistant Examiner*—Filip Zec
(74) *Attorney, Agent, or Firm*—Antonelli, Terry, Stout & Kraus, LLP

(57) ABSTRACT

The scroll compressor includes a scroll compression mechanism portion in combination of an orbiting scroll and a fixed scroll, a frame for supporting the compression portion, a rotary shaft fitted in the orbiting scroll, a motor portion coupled to the rotary shaft, and a hermetic chamber incorporating the above-mentioned components. Windings of a stator of a motor in the motor portion are formed of aluminum wires which are coated with fluororesin compound, that is, the aluminum wires are coated with fluororesin and is molded with a resin material. Ammonia group refrigerant is used in the scroll compressor. Further, a refrigerating system using the above-mentioned scroll compressor, is incorporated therein with a circuit for injecting ammonia group refrigerant into a compression room in the compression mechanism portion.

9 Claims, 2 Drawing Sheets

U.S. PATENT DOCUMENTS

| | | |
|---|---|---|
| 5,818,131 A | 10/1998 | Zhang |
| 6,062,832 A * | 5/2000 | Kawano et al. ............ 418/55.3 |
| 6,110,429 A | 8/2000 | Johansing |
| 6,179,568 B1 | 1/2001 | Phillips |
| 6,189,322 B1 | 2/2001 | Ishihara |
| 6,210,136 B1 | 4/2001 | Kawano |
| 6,216,483 B1 | 4/2001 | Potnis |
| 6,240,736 B1 | 6/2001 | Fujita et al. |
| 6,302,665 B1 | 10/2001 | Esumi |
| 6,305,187 B1 | 10/2001 | Tsuboe et al. |
| 6,457,960 B1 | 10/2002 | Esumi |
| 6,708,520 B1 * | 3/2004 | Yasunori et al. .............. 62/505 |

* cited by examiner

SCROLL COMPRESSOR AND REFRIGERATING SYSTEM USING AMMONIA GROUP REFRIGERANT

CROSS REFERENCE TO RELATED APPLICATION

This application is a continuation application of U.S. Ser. No. 10/237,728, filed Sep. 10, 2002 now U.S. Pat. No. 6,708,520.

BACKGROUND OF THE INVENTION

The present invention relates to a scroll compressor and a refrigerating system (such as an air-conditioner or a refrigerator) using an ammonia group refrigerant.

RELATED ART

A carbon fluoride group refrigerant such as HCFC or CFC which has been conventionally used for a refrigerating system causes earth ozonospheric destruction or global warming, and accordingly, the use of natural refrigerant such as ammonia group refrigerant is desirable. However, the ammonia group refrigerant is combustible and toxic, and further, it is highly corrosive. Accordingly, it cannot be used for a refrigerating system incorporating a copper wire or an organic material.

In a conventional compressor using an ammonia group refrigerant, a compression mechanism portion coupled with a motor portion by a coupling incorporates a mechanical shaft seal assembly for a rotary shaft thereof in order to prevent the refrigerant from leaking between the shaft and the compression mechanism portion, and to seal against the atmosphere. However, it has been difficult to completely prevent the leakage of refrigerant gas and to seal against the atmosphere. Further, large mechanical loss has been caused.

Recently, there has been proposed, as disclosed in JP-A-2000-83339, a compressor having a hermetic type sealed structure in which a compression portion and a motor portion are integrally incorporated with each other, windings for a motor are made of high purity aluminum and are covered with fluororesin which is chemically stable against ammonia. Further, as disclosed in JP-A-10-112949, there has been also proposed such a compressor that a compression portion and a naked motor are accommodated in a hermetic chamber, various parts of the motor being coated thereover with resin materials, and windings in the motor are formed of Ni-plated copper wires or Sn-plated copper wires and are soaked in ether group lubrication oil which is compatible with ammonia so as to prevent direct contact with ammonia.

In the above-mentioned technology using ammonia refrigerant, a screw type or rotary type compressor which is of enclosed type has been developed. Such an enclosed type compressor inevitably requires a covering member for protecting windings of a motor from ammonia, and a molding member for suppressing vibration, and accordingly, cooling therefore is difficult. Further, torsional vibration of a shaft is caused due to interaction between load torque pulsation on the compressor side and electromagnetic pulsation (vibration) caused by electromagnetically exciting force on the motor side, resulting in a risk of burning the motor portion due to electromagnetic pulsation thereby. Further, an ammonia group refrigerant causes a discharge refrigerant temperature to be higher than that of a conventionally used carbon fluoride group refrigerant such as HCFC or CFC refrigerant, resulting in a risk of deteriorating refrigerator oil. Thus, the compressor using ammonia refrigerant has not yet been practically used at present.

Further, in the case of using an aluminum electric wire is used for windings in a motor, the aluminum wire has an electroconductivity which is lower than that of a copper wire, and accordingly, a heat generation value from the motor windings becomes higher, and accordingly, there has been raised such a problem that the temperature of the motor portion becomes higher.

Further, in the case of using fluororesin as a coating material for motor windings, since the fluororesin has a high mold-releasability and nonadhesiveness, the adherence thereof with respect to the motor windings is low, thereby it has been found a risk of burning the motor portion.

SUMMARY OF THE INVENTION

An object of the present invention is to provide a scroll compressor and a refrigerator using ammonia group refrigerant which can ensure a certain reliability that causes a problem as to a hermetic type compressor using ammonia group refrigerant, and which can be used under an ammonia atmosphere.

Another object of the present invention is to provide a scroll compressor and a refrigerator using ammonia group refrigerant, with a high degree of efficiency.

To the end, according to a first aspect of the present invention, there is provided a scroll compressor using ammonia group refrigerant, having a hermetic chamber, and comprising, in the hermetic chamber, a scroll compression mechanism portion in combination of an orbiting scroll and a fixed scroll, a motor portion for driving the compression mechanism portion and a frame for supporting the compression mechanism portion, at least either one of the frame and the fixed scroll of the scroll compression mechanism portion being made into close contact with the inner peripheral surface of the hermetic chamber, wherein ammonia group refrigerant is used, and aluminum wires coated thereover with fluororesin is used for windings of the motor portion.

In the above-mentioned aspect, the windings of the motor portion, are preferably formed of aluminum wires which are subjected to chemical conversion coating of a fluorine compound and are then coated thereover with the fluororesin, and in particular, the outer surfaces of the aluminum wires subjected to the chemical conversion coating may be roughened in order to enhance the adhesion of the fluororesin with which the aluminum wires are coated thereover. Alternatively, the fluororesin with which the aluminum wires are coated, is subjected to photochemical reaction with the use of amine compound, and the fluororesin as a covering material is subjected to surface reforming, in order to enhance the adhesion of the aluminum wires to the covering material.

Further, if coil ends in the motor portion are molded with dicyclopentadiene, the vibration of the motor windings can be suppressed. Further, motor stator windings which are concentrically wound can enhance the molding efficiency at the coil end thereof. Further, a DC brushless motor is used in the motor portion, thereby it is possible to enhance the efficiency so as to restrain heat-generation of the motor portion.

Further, according to a second aspect of the present invention, there is provided a refrigerator using ammonia group refrigerant incorporating a scroll compressor and a condenser, the scroll compressor according to the first aspect of the present invention being also used as the scroll compressor in this aspect, and a liquid injection circuit for supplying ammonia group liquid refrigerant into a compression room of the compression mechanism portion of the scroll compressor.

According to a third aspect of the present invention, there is provided a refrigerator including a scroll compressor using ammonia group refrigerant having a hermetic chamber and comprising, in the hermetic chamber, a scroll compression mechanism portion in combination of an orbiting scroll and a fixed scroll and a motor portion for driving the compression mechanism portion, the motor portion having windings formed of aluminum wires which are coated thereover with fluororesin, wherein the motor portion is cooled by discharged refrigerant gas from the compression mechanism portion before the refrigerant gas is fed outside of the hermetic chamber, a condenser for condensating the refrigerant discharged from the scroll compressor, a liquid receiver provided downstream of the condenser, and a liquid injection circuit for feeding liquid refrigerant from the liquid receiver into a compression room of the scroll compressor.

In this configuration, there is preferably provided an injection valve or an electronic expansion valve in the above-mentioned liquid injection circuit, the injection valve or the expansion valve being controlled so as to adjust the quantity of liquid injection in accordance with a discharge side temperature of the scroll compressor.

With this configuration in which liquid injection is made for the compressor, the temperature of refrigerant fluid can be restrained during compression, and accordingly, it is possible to eliminate such a disadvantage that the efficiency of the compressor is lowered as the temperature of the refrigerant discharged from the compressor is increased in the case of a compressor using ammonia group refrigerant. That is, according to the present invention, the temperature of the refrigerant is restrained from becoming high, thereby it is possible to enhance the efficiency of the compressor. In particular, in the case of using a motor which incorporates aluminum electric wires, and with which the value of heat generation tends to be high, the configuration in which the motor incorporated in, for example, in a hermetic type compressor is cooled by discharged gas from the compressor, can cool the motor with the discharged gas whose temperature is lowered through liquid injection, thereby it is possible to exhibit such a technical effect that the motor can be efficiently lowered. Further, according to the present invention, the scroll compressor is used, and accordingly, the liquid injection can be simply carried out in comparison with the other compressors. Further, with the use of the scroll compressor, variation in the torque of the compressor can be restrained to a small value, and accordingly, electromagnetic vibration can be reduced, thereby it is possible to enhance the reliability.

Detailed description will be made of preferred embodiments of the present invention with reference to the accompanying drawings in which:

DESCRIPTION OF THE PREFERRED EMBODIMENTS

Explanation will be made of an embodiment of the present invention with reference to the accompanying drawings.

Figure 1:
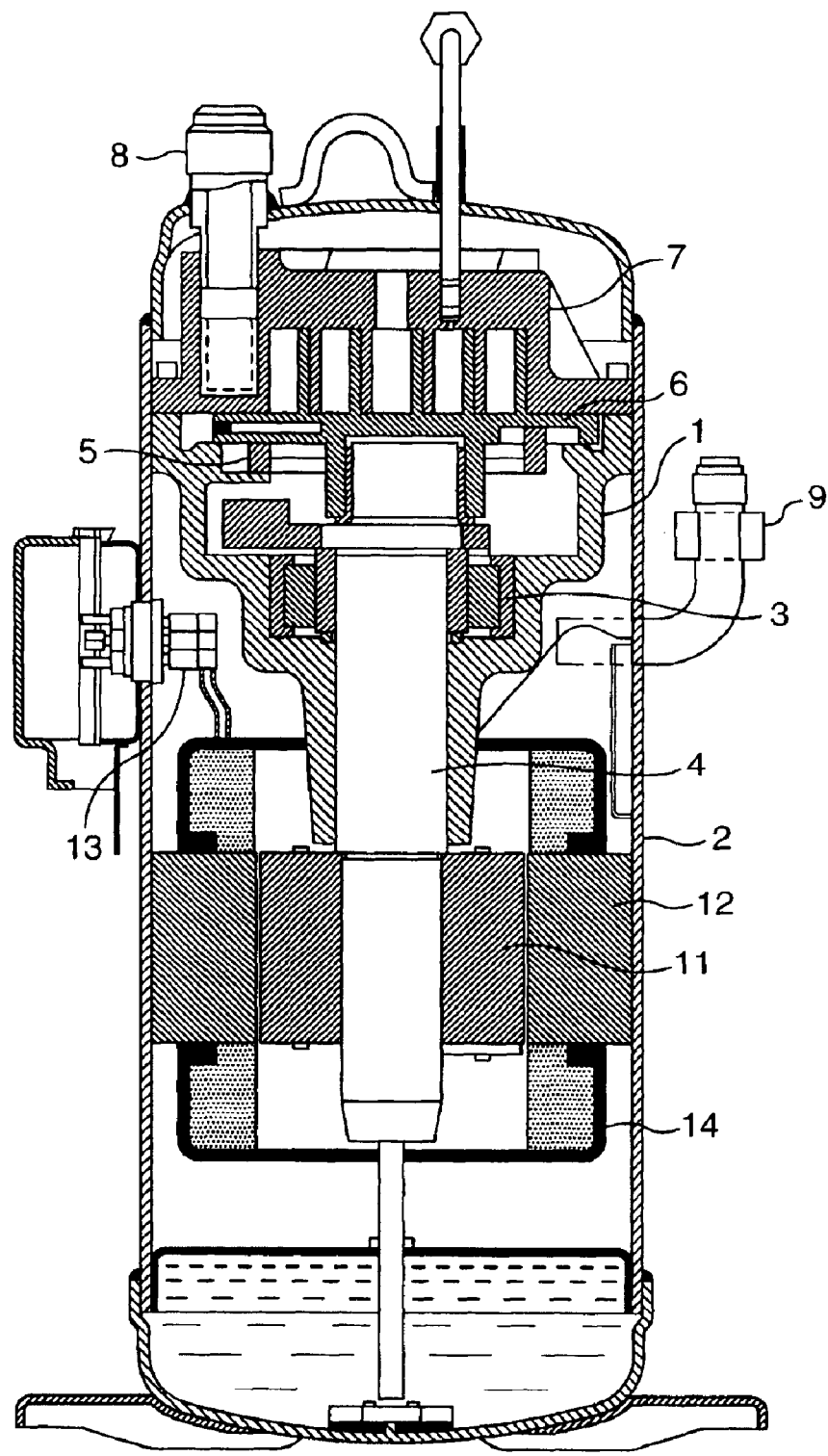
FIG. 1 is a longitudinal view illustrating an embodiment of a scroll compressor using ammonia group refrigerant, according to the present invention.

Referring to FIG. 1 which shows a scroll compressor using ammonia group refrigerant used in this embodiment, the scroll compressor includes a compression mechanism portion in which an orbiting scroll 6 and a fixed scroll are engaged with each other, a frame 1 for supporting the compression mechanism portion, an Oldham's ring 5 for preventing rotation of the orbiting scroll, a rotary shaft attached to the orbiting scroll, a motor portion fitted to the rotary shaft, for driving the rotary shaft, and a hermetic chamber 2 enclosing the former components. A liquid injection pipe line 10 in communication with a liquid injection circuit 29 (refer to FIG. 3) is attached to a mirror plate portion of the fixed scroll 7, and accordingly, liquid refrigerant downstream of a condenser in a refrigerating cycle can be fed into a compression room of the compression mechanism portion. Thereby it is possible to restrain the temperature of refrigerant fluid from increasing during compression of the refrigerant. The motor portion composed of a stator 12 and an armature 11 has a configuration which will be explained below. That is, electric wires (windings) of the stator 12 are formed of aluminum wires 16 which are coated thereover with a fluororesin coating 17 after they are subjected to chemical conversion coating of fluorine group compound (refer to FIG. 2). It is noted that the surfaces of the wire material for the windings may be roughened, or the surface of the fluororesin of the coating 17 may be reformed by photochemical reaction with the use of amine compound in order to enhance the adherence between the wiring material of the windings and the coating. With this arrangement in which the adherence between the windings of the motor portion and the coating may be enhanced, it is possible to ensure the reliability which has conventionally caused a problem in view of an enclosed type compressor using ammonia group refrigerant.

Further, a coil end part of the stator 11 is fastened with a tape made of polyphenyl sulfide, and thereafter, formed thereto with a resin molding 14 made of dicyclopentadiene resin. Further, by welding the hermetic chamber 2, the compressor can be completely sealed from the atmosphere.

It is noted that there are shown a roller bearing for journaling the crank shaft 4, a suction pipe 8, a discharge pipe 9 and a power source terminal portion 13.

Figure 2:
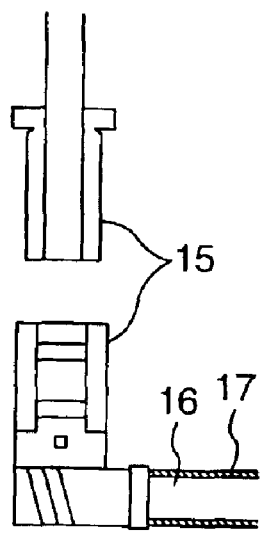
FIG. 2 is a detailed view illustrating a power source terminal portion and a lead wire portion in the scroll compressor shown in FIG. 1.

Detailed explanation will be made of the configuration of the power source terminal portion 13 and the lead wire portion of the motor shown in FIG. 1 with reference to FIG. 2. The lead wire of the motor is formed of an aluminum wire 16 coated thereover with fluororesin 17 after it is subjected to chemical conversion coating of fluorine compound. Further, a power source terminal 15 in the power source terminal portion 13 is made of nickel which is ammonia-resistant.

Further, in this embodiment, a DC brushless motor is used as the motor. Thus, a scroll compressor using ammonia group refrigerant can be provided in combination of a highly efficient scroll compressor and ammonia serving as highly efficient natural refrigerant, which has not been able to be conventionally obtained, and which can contribute to prevention of the global warming and also to electrical power saving.

Figure 3:
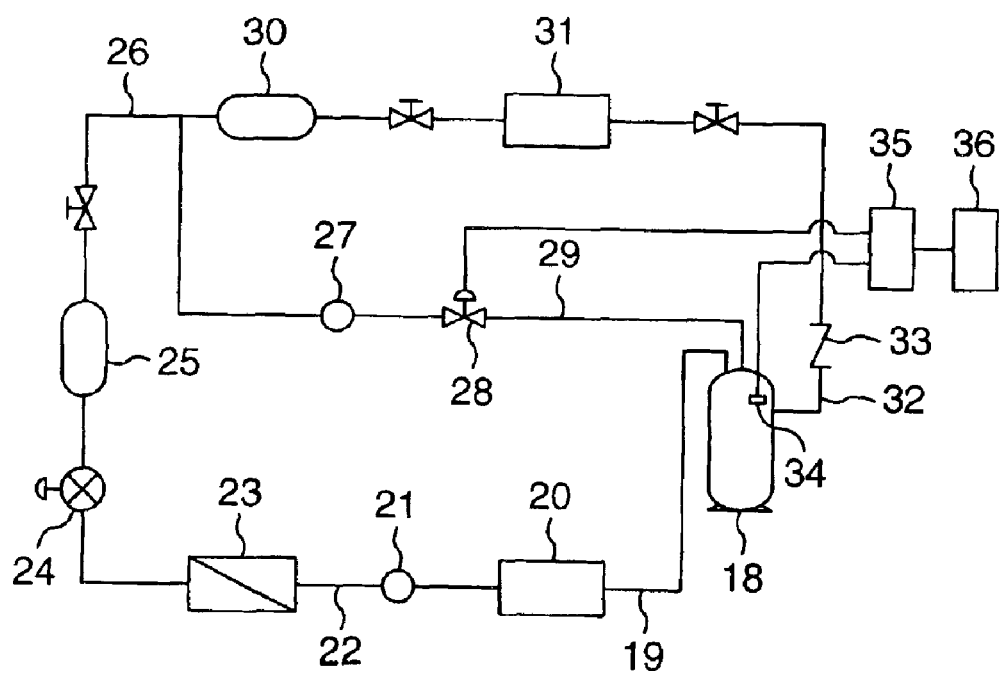
FIG. 3 is a block diagram illustrating a refrigerating cycle of a refrigerator using ammonia group refrigerant.

Explanation will be hereinbelow made of an embodiment of a refrigerator using ammonia group refrigerant with reference to FIG. 3.

Refrigerant gas sucked into a scroll compressor 18 from a suction pipe line 19 through a suction pipe 8, is compressed in a compression room defined between an orbiting scroll 6 and a fixed scroll 7. The compressed refrigerant gas cools the motor portion, and then is discharged from a discharge pipe 9 into a discharge pipe line 32, and is led through a check valve 33 and into a condenser 31 in which the refrigerant gas is condensated. Thereafter, the condensated refrigerant gas is fed through a liquid receiver 30, a refrigerant liquid pipe line 26 and a dryer 25, and is then expanded by an expansion valve 24. The refrigerant is then fed into an evaporator 23 where it is turned into gas which is then fed through a refrigerant gas pipe line 2, a strainer 21 and an accumulator 20, and is finally returned into the compressor 18 by way of the intake pipe line 19. Thus, a cooling cycle is established as mentioned above.

Further, the liquid receiver 30 provided downstream of the condenser is connected to the compression room of the scroll compressor 18 by way of the liquid injection circuit 29, and accordingly, a part of the condensated liquid refrigerant can be fed into the compression room of the scroll compressor 18 by way of a strainer 27 and an electronic expansion valve 28 connected in the injection circuit 29. If the liquid injection circuit 29 is connected to a lower sump part within the liquid receiver 30, liquid injection of the liquid refrigerant can be stably made always.

In the liquid injection circuit, the opening degree of the electronic expansion valve 28 is controlled in accordance with a discharge side temperature of the scroll compressor, and accordingly, the liquid injection quantity can be adjusted. For example, a temperature of discharged gas from the compressor is detected by a thermister 34, and is then compared with a set value of the discharge temperature which has been stored beforehand. If the detected temperature is higher than the set value, the opening degree of the electronic expansion valve 28 is increased, but if it is lower than the latter, the opening degree is decreased. For this control, there are provided a control device 36 and a control signal output device 35 with which the opening degree of the electronic expansion valve 28 can be continuously adjusted. With this arrangement in which the discharge side temperature of the compressor is controlled, thereby it is possible to aim at preventing the compressor from overheating. Further, in this embodiment, as shown in FIG. 1, the discharged refrigerant gas from the compression mechanism portion cools the motor portion before it is fed outside of the hermetic chamber 2 by way of the discharge pipe 9, and accordingly, the motor portion can be satisfactorily cooled by the discharge gas having a lower temperature, thereby it is possible to prevent deterioration of lubrication oil (refrigerator oil), and to carry out efficient and stable operation of refrigerating cycle. It is noted that an injection valve which can adjust a flow rate can be provided, instead of the electronic expansion valve 28.

According to the present invention, with the provision of the scroll compressor using ammonia group refrigerant, and windings in the motor portion, which are formed of aluminum wires coated thereover with fluororesin, a higher reliability which has caused a problem with a hermetic type compressor using ammonia group refrigerant, can be ensured, thereby it is possible to provide a scroll compressor using ammonia group refrigerant, which is tough under an ammonia atmosphere.

In particular, the surfaces of the aluminum wires subjected to chemical conversion coating are roughened or fluororesin with which the aluminum wires are coated, is subjected to photochemical reaction using amine compound so as to reform the surface of the fluororesin serving as the cover coating, and therefor the adherence between the aluminum wires and the cover coating can be enhanced, thereby it is possible to further enhance the reliability of the motor.

Further, according to the present invention, the refrigerator using the above-mentioned scroll compressor and ammonia group refrigerant, is provided with the liquid injection circuit for feeding ammonia group liquid refrigerant into the compression room of the compression mechanism portion of the scroll compressor so that the temperature of the refrigerant fluid during compression can be restrained from being increased, and accordingly, it is possible to provide a refrigerator using ammonia group refrigerant, which can exhibit a high degree of efficiency even though there are used ammonia group refrigerant whose discharge temperature tends to be higher, and aluminum wires having a high heat generation value. Further, since the scroll compressor is used, it can simply carry out injection in comparison with the other compression mechanisms. Further, with the use of the scroll compressor, variation in torque of the compressor can be restrained, and accordingly, electromagnetic vibration can be reduced, thereby it is possible to enhance the reliability of the motor.

In particular, with such a configuration that a hermetic chamber in which a motor is incorporated, and the motor is cooled by gas discharged from the compressor, the motor can be cooled with discharged gas whose temperature is greatly lowered through liquid injection, that is, the motor can be efficiently cooled. Further, a DC brushless motor is used as the motor, a high degree of efficiency can be obtained while heat generation can be well-restrained, thereby it is possible to provided a refrigerator using ammonia group refrigerant, with a high degree of efficiency.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A scroll compressor adapted to be used for a refrigerating system, having a container, and comprising, in the container, a scroll compressor mechanism portion including an orbiting scroll and a fixed scroll, and the motor portion for driving the compressor mechanism portion, wherein an ammonia group refrigerant is used as a working medium, aluminum wires are used for windings in the motor portion, and the scroll compressor portion has a compression chamber which incorporates therein an injection circuit for feeding a part of high pressure refrigerant cooled by a condenser in the refrigerating system so as to restrain a temperature of the refrigerant from rising during compression stroke.

2. A scroll compressor as set forth in claim 1, wherein the aluminum wires in the motor portion are coated thereover with fluororesin.

3. A scroll compressor as set forth in claim 2, wherein the fluororesin with which the aluminum wires are coated thereover is subjected to photochemical reaction using amine compound so as to carry out surface-reforming for the fluororesin as a coating material so as to enhance the adherence between the aluminum wires and the coating material.

4. A scroll compressor as set forth in claim 1, wherein the windings in the motor portion are molded at their ends with dicyclopentadiene.

5. A scroll compressor as set forth in claim 1, wherein the motor portion includes a DC brushless motor.

6. A scroll compressor as set forth in claim 5, wherein stator windings in the motor portion are formed by concentrated-winding so as to enhance the working efficiency of molding of the winding ends.

7. An ammonia group refrigerant type refrigerating system comprising:
- a scroll compressor composed, in a container, of a scroll compressor mechanism portion incorporating a scroll compressor mechanism portion including an orbiting scroll and a fixed scroll, and a motor portion for driving the compressor mechanism portion, aluminum wires being used for windings in the motor portion,
- a condenser for condensing refrigerant discharged from the scroll compressor, and
- a liquid injection circuit for feeding liquid refrigerant cooled by the condenser into a compression chamber in the scroll compressor so as to restrain a temperature of the refrigerant from rising during compression stroke,
- wherein ammonia group refrigerant is used as the refrigerant, and a flow rate control means for controlling an injection flow rate so as to restrain a discharge temperature of the scroll compressor from rising is provided in the liquid injection circuit.

8. An ammonia group refrigerating type refrigerating system as set forth in claim 7, wherein the flow rate control means in the liquid injection circuit is an injection valve or an electronic expansion valve which is controlled so that a liquid injection quantity is controlled in relation to a temperature of a discharge side of the scroll compressor.

9. An ammonia group refrigerating system as set forth in claim 7, wherein the aluminum wires in the motor portion are coated thereover with fluororesin.

* * * * *